United States Patent [19]
Crotts

[11] Patent Number: 4,815,158
[45] Date of Patent: Mar. 28, 1989

[54] TANGLE-FREE CARWASH BRUSH

[75] Inventor: Lonnie M. Crotts, Summerfield, N.C.

[73] Assignee: Bivens Winchester Corporation, Danville, Va.

[21] Appl. No.: 177,174

[22] Filed: Apr. 4, 1988

[51] Int. Cl.[4] .............................................. B60S 3/06
[52] U.S. Cl. ................................... 15/53 A; 15/97 B; 15/179; 15/230; 15/230.16; 15/230.19; 15/DIG. 2
[58] Field of Search ........... 15/DIG. 2, 53 A, 53 AB, 15/97 B, 179, 183, 1.5, 230, 230.16, 230.19

[56] References Cited
U.S. PATENT DOCUMENTS

| | | | |
|---|---|---|---|
| 3,986,223 | 10/1976 | Kiefer | 15/1.5 R |
| 4,338,698 | 7/1982 | Beer et al. | 15/183 |
| 4,377,878 | 3/1983 | Pecora | 15/97 B |

*Primary Examiner*—Edward L. Roberts
*Attorney, Agent, or Firm*—Krass & Young

[57] ABSTRACT

A pair of diametrically offset flaps of feltlike fabric are mounted at opposite ends of a filament-strand carwasher brush to clear the brush strands away from mirrors and antennae as the vehicle is washed.

8 Claims, 2 Drawing Sheets

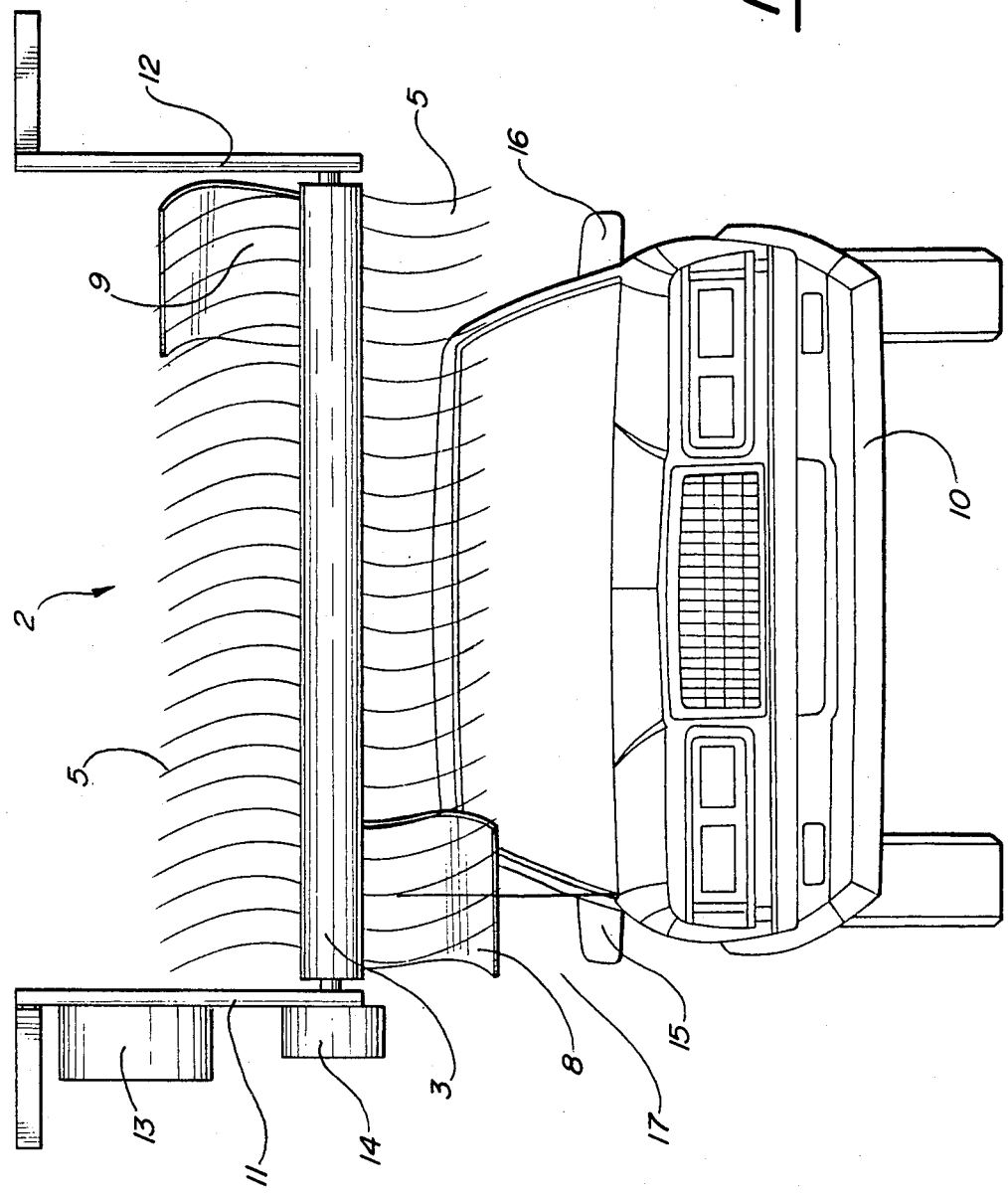

TANGLE-FREE CARWASH BRUSH

FIELD OF THE INVENTION

This invention pertains to vehicle washers and particularly to a rotary top brush for a vehicle washer in which flaps or paddle elements are positioned among brush strands to prevent such strands from damaging the vehicle being washed.

BACKGROUND OF THE INVENTION

It is now common to wash vehicles such as cars, trucks and busses with an apparatus, usually known as a "carwasher", having rotating top and side brushes, and a suitable water/chemical spray system. One popular commercial apparatus is manufactured by the Bivens Winchester Corporation of Danville, Virginia and is sold under the trade-name "SLANT Model No. 460A". This product is described in part in U.S. Pat. Nos. 4,470,167 and 4,593,425, the disclosures of which are incorporated herein by reference.

Carwasher brushes generally comprise a shaft and a plurality of brush strand or bristle sections which are wrapped around the shaft in contiguous fashion. The strands or bristles are typically long plastic filaments or thin strips of felt-like material which contact the vehicles during the washing process. The brush shaft is mounted for rotation and is driven by a motor.

A vehicle has many different objects on the outside of its body, such as antennas, mirrors, and windshield wipers. The brush filaments or thin strips can become entangled with these objects during the washing process. This may prevent complete washing, leave detached filaments or strips on the vehicles, and, in the extreme case, loosen or break the objects from the vehicle. Each of these results displeases either the operator of the vehicle washing apparatus or the owner of the vehicle, or both.

The present invention solves the problems inherent to the use of this type of brush element when in contact with projections on the outer surface of a vehicle.

U.S. Pat. Nos. 3,506,995, 3,750,212 and 3,443,270 utilize rotary brushes and appear to address the above-described problems by avoiding contact between the rotary brushes and the portions of the vehicle most likely to cause problems. This is not always practical with projections the locations of which cannot be conveniently and specifically anticipated. Moreover, disengaging or shutting off the brush leaves part of the vehicle unwashed.

SUMMARY OF THE INVENTION

The present invention is generally characterized as a rotary cleaning device or brush for vehicle washing apparatus which combines freely hanging, thin, limp bristles or strands and at least one limp, flexible paddle or flap attached to a rotary shaft. As the shaft is rotated, centrifugal force extends the bristles ad the paddle(s) into a working brush. The bristles perform the function of washing the vehicle by contact. The paddle(s) separate the bristles from one another and prevent the bristles from being entangled with projections on the surface of the vehicle by slapping or paddling the bristles away from the potentially entangled projection before it becomes sufficiently tangled to cause a problem.

It is therefore a general object of the present invention to provide improved vehicle washing appartus.

A further object is to provide a bristle or strand-type brush for vehicle washing apparatus which brush is capable of operation on a vehicle without becoming entangled with any normal projections on the vehicle.

A further object is to provide the above "tangle-free" operation without having to disengage or stop the brushing action in areas where projections exist.

A further object is to provide the above "tangle-free" operation in a brush unit that is capable of being mounted with any orientation to the vehicle.

BRIEF DESCRIPTION OF THE DRAWINGS

For the purpose of illustrating the invention the drawings depict a presently preferred form. It is understood, however, that this invention is not limited to the precise arrangements and instrumentalities depicted:

FIG. 4 is a perspective view of the preferred embodiment as it passes over a vehicle.

DETAILED DESCRIPTION OF THE PREFERRED EMBODIMENT

Figure 1:
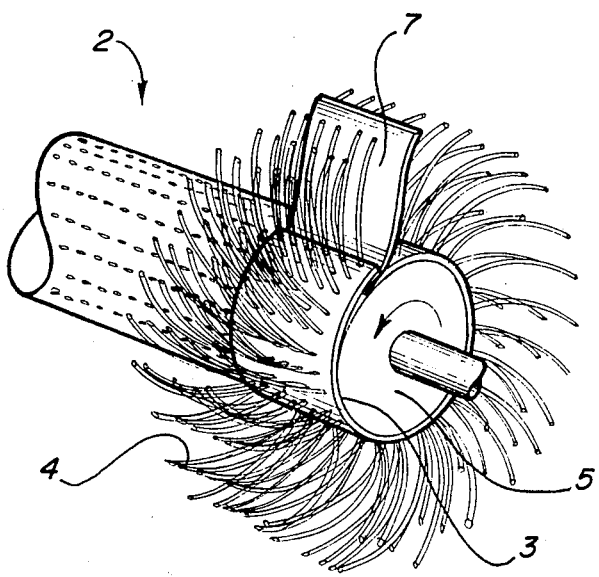
FIG. 1 is a perspective view of a section of a rotary brush shaft with a bristle and flap section attached thereto.
Figure 2:
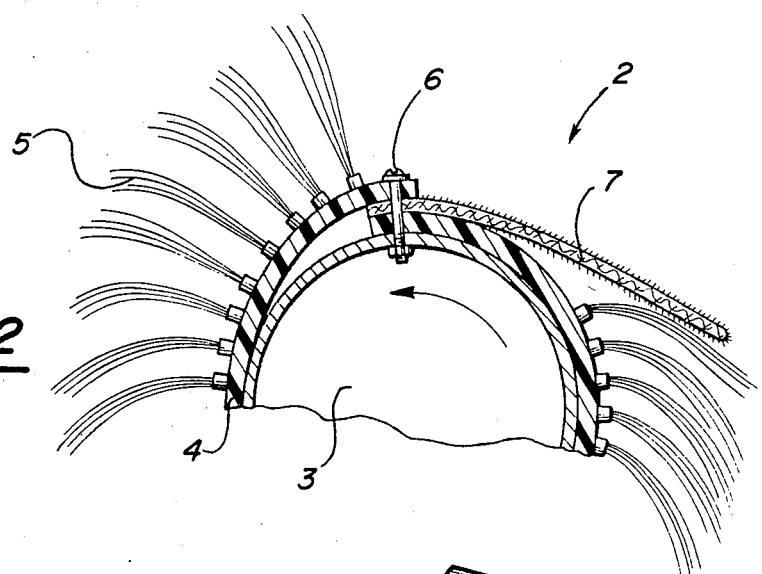
FIG. 2 is a cross section of a section of the brush of FIG. 1.

Looking to FIGS. 1 and 2, a portion of a carwasher top brush 2 is shown to comprise a shaft 3 wrapped with a plurality of bristle sections 4 in side-by-side, contiguous arrangement along the shaft axis. Each bristle section 4 comes as a flat strip from which a large number of filament or strip bristles 5 extend, the length of such bristles being on the order of two feet. The brush 2 is formed by wrapping each section 4 around the shaft 3 so that a slight overlap is formed, a pin, rivet or screw 6 is disposed through the overlap to secure the section to the shaft as shown in FIG. 2. Section 4 may be individually replaced as they become worn or damaged. The brush thus far described is conventional.

In accordance with the invention, a flexible paddle 7 of felt-like man-made material is attached to the brush shaft 3 adjacent one longitudinal end by inserting the paddle 7 between the overlapping ends of section 4 and driving the pin 6 through the paddle 7 as well as the section 4. Several pins may be required for each paddle 7, depending on the width of the sections 4. The material of paddle 7 is soft enough to hang limp when the shaft 3 is not rotating and to prevent damage to the finish of a vehicle. The paddle 7 is of a length approximately equal to or slightly less than the length of the bristles 5, although it may vary in width, we have achieved good results with paddles on the order of 8 inches wide. The paddle 7 serves the purpose of separating the bristles 5 from each other and urging the bristles away from any objects on a vehicle before they become entangled. The paddle 7 also effectively extends operating the radius of the brush 2 by adding rigidity to the bristles 5. By maintaining the bristles 5 in a straight extended configuration, paddle 7 also improves the cleaning performance of the brush.

Figure 3:
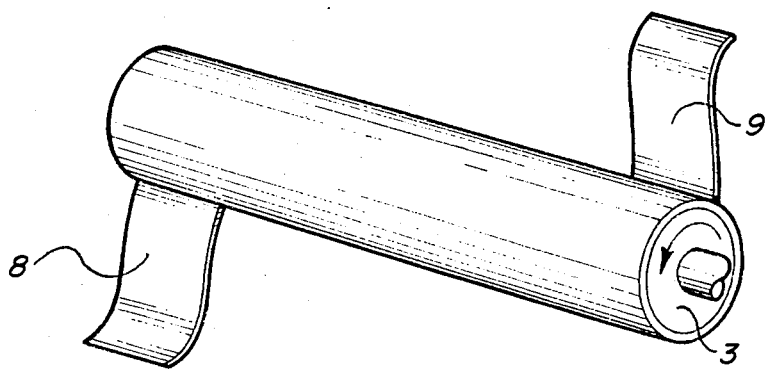
FIG. 3 is a schematic representation of a balanced top brush with two flaps or paddles.

As shown in FIG. 3, the preferred embodiment employs a pair of paddles 8 and 9 mounted at opposite ends of shaft 2 and extending in opposite directions from one another for dynamic balance.

With reference to FIG. 4, the brush 2 previously described is oriented to wash the upper surfaces of a vehicle 10. The shaft 3 is supported horizontally on pivot arms 11 and 12 in the manner described more fully in the U.S. Pat. Nos. 4,470,167 and 4,593,425 mentioned above. The shaft is rotated by motor 13 operating through gearbox 14. This causes the bristles 5 and both paddles 8 and 9 to be extended radially outward as the brush 2 passes over the vehicle 10. As is depicted, the paddles 8 and 9 are located at the ends of brush 2 to cover the areas most likely to contain projections, such as mirrors 15 and 16 and antennas 17.

Inasmuch as the present invention is subject to many variations, it is intended that all matter in the foregoing description and accompanying drawings be interpreted as illustrative and not as limiting. The placement of the paddles 8 and 9 is a direct product of where on a vehicle the brush unit will operate, and multiple variations are possbile. The terms "strand" and "bristle" and "strand-like" are used herein in a broad sense to embrace many different types of brush elements, from pure filaments to thicker strips of perforated plastic felt; the operative facts being that the paddles 7, 8 and 9 must be wider than the bristles 5 and less compliant parallel to the brush axis to perform the cleaning function described above. While shown in a top brush, the invention is equally advantageous when used in side brushes, window brushes and rocker panel brushes.

I claim:

1. A brush for washing a vehicle comprising:
   a rotary shaft having an axis of rotation;
   a plurality of strand-like elements substantially uniformly attached around and along said shaft to form a rotary brush; and
   at least one solid flexible paddle attached to said rotary shaft among and circumferentially interleaved between the elements and offset from the center of said brush, the width of said paddle along the brush shaft axis being substantially less than the overall width of said brush but great enough to overlie a plurality of said elements, said paddle being extendible radially outward by centrifugal force upon rotation of said rotary shaft to prevent the brush elements from becoming entangled with external components of a vehicle.

2. Apparatus as recited in claim 1 wherein said flexible paddle is mounted adjacent one end of said shaft.

3. Apparatus as recited in claim 2 further including a second flexible paddle mounted adjacent the opposite end of said rotary shaft; the first and second paddles being separated by an intermediate gap of substantial width.

4. Apparatus as recited in claim 3, wherein said one and second flexible paddles are mounted diametrically opposed to each other for balance.

5. The apparatus as recited in claim 1 wherein said filament-like bristles comprise plastic filaments.

6. The apparatus as recited in claim 1 wherein said filament-like bristles are attached to said shaft in a plurality of bristle sections.

7. A vehicle washing brush comprising:
   a rotary shaft;
   a plurality of brush element sections wrapped around said shaft in side-by-side relationship; each section including a flexible base and a plurality of flexible brush elements attached to said base to extend radially from said shaft axis when said shaft is rotated;
   each of said section bases being disposed around said shaft and overlapped end-to-end to define an overlap area, each said section being fastened in the overlap area; and
   a solid flap of flexible material fastened to at least one of the sections in the overlap area thereof and excluding from said section circumferentially between the elements thereof.

8. A brush as defined in claim 7 wherein the flap is disposed between the overlapping ends of the brush section.

* * * * *